United States Patent
Chen et al.

(10) Patent No.: US 10,778,475 B2
(45) Date of Patent: Sep. 15, 2020

(54) METHOD AND DEVICE FOR SRS TRANSMISSION

(71) Applicant: GUANGDONG OPPO MOBILE TELECOMMUNICATIONS CORP., LTD., Dongguan, Guangdong (CN)

(72) Inventors: Wenhong Chen, Dongguan (CN); Zhihua Shi, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/700,966

(22) Filed: Dec. 2, 2019

(65) Prior Publication Data

US 2020/0106647 A1    Apr. 2, 2020

Related U.S. Application Data

(63) Continuation of application No. PCT/CN2018/072502, filed on Jan. 12, 2018.

(51) Int. Cl.
*H04W 4/00*     (2018.01)
*H04L 25/02*    (2006.01)
(Continued)

(52) U.S. Cl.
CPC ........ *H04L 25/0226* (2013.01); *H04L 1/0026* (2013.01); *H04L 5/0051* (2013.01);
(Continued)

(58) Field of Classification Search
CPC . H04L 25/0226; H04L 1/0026; H04L 5/0051; H04L 5/0091; H04L 5/001;
(Continued)

(56) References Cited

U.S. PATENT DOCUMENTS 8,374,212 B2 *  2/2013  Charbit ................. H04B 1/715
                                                        375/132
8,675,605 B2 *  3/2014  Charbit ............. H04W 72/1205
                                                        370/252
(Continued)

FOREIGN PATENT DOCUMENTS

CN    102412889 A    4/2012
CN    102668673 A    9/2012
(Continued)

OTHER PUBLICATIONS

Huawei al et; UL SRS design for beam management and CSI acquisition 3rd Generation Partnership Project (3GPP); 3GPP TSG RAN WG1 Meeting #90; R1-1712238; Aug. 25, 2017(Aug. 25, 2017) Section 2.2.1.

(Continued)

*Primary Examiner* — Stephen M D'Agosta
(74) *Attorney, Agent, or Firm* — Ladas & Parry, LLP

(57) ABSTRACT

The embodiments of the disclosure provide a method and device for Sounding Reference Signal (SRS) transmission. The method includes that: User Equipment (UE) determines an activated uplink Bandwidth Part (BWP); the UE determines an SRS parameter configuration corresponding to the active uplink BWP; and the UE transmits an SRS on the uplink BWP according to the SRS parameter configuration. With adoption of the embodiments of the disclosure, SRS transmission flexibility can be improved.

22 Claims, 3 Drawing Sheets

(51) Int. Cl.
*H04L 1/00* (2006.01)
*H04L 5/00* (2006.01)
*H04W 56/00* (2009.01)
*H04W 72/04* (2009.01)
*H04W 80/08* (2009.01)

(52) U.S. Cl.
CPC ......... *H04L 5/0092* (2013.01); *H04W 56/001* (2013.01); *H04W 72/042* (2013.01); *H04W 72/0473* (2013.01); *H04W 80/08* (2013.01)

(58) Field of Classification Search
CPC .. H04L 5/0048; H04L 5/0098; H04W 56/001; H04W 72/042; H04W 72/0473; H04W 80/08; H04W 72/0453; H04W 72/14; H04W 74/0833; H04B 7/0617; H04B 7/0695; H04B 7/0626
See application file for complete search history.

(56) References Cited

U.S. PATENT DOCUMENTS

| | | | |
|---|---|---|---|
| 8,737,335 B2 | 5/2014 | Konishi | |
| 8,817,818 B2* | 8/2014 | Onggosanusi | H04L 5/0048 370/468 |
| 8,848,520 B2 | 9/2014 | Chen | |
| 9,215,725 B2* | 12/2015 | Behnamfar | H04W 72/085 |
| 9,276,710 B2* | 3/2016 | Damnjanovic | H04L 5/003 |
| 9,450,722 B2* | 9/2016 | Sorrentino | H04L 5/0048 |
| 9,844,072 B2* | 12/2017 | Chen | H04L 5/0007 |
| 2009/0181687 A1* | 7/2009 | Tiirola | H04L 5/0048 455/450 |
| 2011/0199944 A1 | 8/2011 | Chen | |
| 2012/0014330 A1 | 1/2012 | Damnjanovic | |
| 2012/0106489 A1 | 5/2012 | Konishi | |
| 2018/0183551 A1* | 6/2018 | Chou | H04W 72/044 |
| 2019/0053103 A1* | 2/2019 | Manolakos | H04L 5/0048 |
| 2019/0104522 A1* | 4/2019 | Yoo | H04W 72/0453 |
| 2019/0104543 A1* | 4/2019 | Park | H04L 1/1671 |
| 2019/0132845 A1* | 5/2019 | Babaei | H04W 72/0453 |
| 2019/0165971 A1* | 5/2019 | Manolakos | H04L 5/0048 |
| 2020/0008155 A1 | 1/2020 | Li et al. | |

FOREIGN PATENT DOCUMENTS

| | | |
|---|---|---|
| CN | 102771171 A | 11/2012 |
| CN | 103369654 A | 10/2013 |
| EP | 3592045 A1 | 1/2020 |
| WO | 2019136724 A1 | 7/2019 |

OTHER PUBLICATIONS

International Search Report in the international application No. PCT/CN2018/072502, dated Sep. 28, 2018.
Written Opinion of the International Search Authority in the international application No. PCT/CN2018/072502, dated Sep. 28, 2018.
LG Electronics Inc: "Summary of E-mail discussion on [99bis#43][NR]", 3GPP Draft; R2-1713879 Summary of E-Mail Discussion [99B1543] Impact of BWP, 3rd Generation Partnership Project (3GPP), vol. RAN WG2, no. Reno, USA; Nov. 17, 2017-Dec. 1, 2017 Nov. 17, 2017 (Nov. 17, 2017),XP051372515, Retrieved from the Internet:URL:http://www.3gpp.org/ftp/tsg%5Fran/WG2%5FRL2/TSGR2%5F100/Docs/ [retrieved on Nov. 17, 2017] * section 4*.
Huawei et al: "Remaining issues on bandwidth part", 3GPP Draft; R1-1719380, 3rd Generation Partnership Project (3GPP), vol. RAN WG1, no. Reno, USA; Nov. 27, 2017-Dec. 1, 2017 (Nov. 18, 2017) XP051369289, Retrieved from the Internet: URL: http://www.3gpp.org/ftp/tsg%5Fran/WG1%5FRL1/TSGR1 %5F91 /Docs/ [retrieved on Nov. 18, 2017] * section 3.1; tables 3, 4 *.
Supplementary Partial European Search Report in the European application No. 18900436.9, dated Mar. 20, 2020.

* cited by examiner

METHOD AND DEVICE FOR SRS TRANSMISSION

This application is a continuation of PCT Application No. PCT/CN2018/072502, filed on Jan. 12, 2018 and named after "METHOD AND DEVICE FOR SRS TRANSMISSION", the contents of which are hereby incorporated by reference in its entirety.

BACKGROUND

In New Radio (NR), a carrier may include multiple Bandwidth components (BWPs). For User Equipment (UE), only one uplink BWP can be activated for uplink transmission at a moment. Similarly, only one downlink BWP can be activated for downlink transmission at a moment. The specific BWP presently activated for the UE is indicated through Downlink Control Information (DCI), and the BWP for transmission at the UE may be dynamically switched in multiple BWPs in a carrier. If SRS transmission may be dynamically switched on multiple BWPs, how to configure transmission of an SRS is a technical problem to be solved.

SUMMARY

The disclosure relates to the technical field of communications, and particularly to a method and device for Sounding Reference Signal (SRS) transmission.

Embodiments of the disclosure provide a method and device for SRS transmission, which are adopted to improve the flexibility of SRS transmission.

According to a first aspect, the embodiments of the disclosure provide a method for SRS transmission, which may include the following operations.

UE determines an uplink BWP which is active.

The UE determines an SRS parameter configuration corresponding to the uplink BWP which is active.

The UE transmits an SRS on the uplink BWP according to the SRS parameter configuration.

According to a second aspect, the embodiments of the disclosure provide UE, which may include a processing unit and a communication unit.

The processing unit may be configured to determine an active uplink BWP.

The processing unit may further be configured to determine an SRS parameter configuration corresponding to the active uplink BWP.

The processing unit may further be configured to transmit an SRS on the uplink BWP through the communication unit according to the SRS parameter configuration.

According to a third aspect, the embodiments of the disclosure provide UE, which may include one or more processors, one or more memories, one or more transceivers and one or more programs, the one or more programs being stored in the memory and configured to be executed by the one or more processors and the programs including instructions configured to execute the steps in the method according to the first aspect.

According to a fourth aspect, the embodiments of the disclosure provide a computer-readable storage medium, which may store a computer program configured for electronic data exchange, the computer program enabling a computer to execute part or all of the steps described in any method according to the first aspect.

According to a fifth aspect, the embodiments of the disclosure provide a computer program product, which includes a non-transitory computer-readable storage medium storing a computer program. The computer program may be operated to enable a computer to execute part or all of the steps described in any method according to the first aspect. The computer program product may be a software installation package.

It can be seen that, in the disclosure, a network device may set a set of SRS parameter configurations for each BWP of the UE; then, under the condition that the UE is dynamically switched to a certain BWP for SRS transmission, the UE may determine the SRS parameter configuration corresponding to the BWP as the SRS parameter configuration for SRS transmission; and finally, the UE transmits the SRS on the BWP on the basis of the SRS parameter configuration corresponding to the BWP. In such a manner, different SRS parameter configurations may be adopted for SRS transmission on different BWPs, and SRS transmission flexibility is further improved.

These aspects or other aspects of the disclosure will become clearer and easier to understand through the following descriptions about the embodiments.

BRIEF DESCRIPTION OF DRAWINGS

In order to describe the technical solutions in the embodiments of the disclosure or a background art more clearly, the drawings to be used for descriptions about the embodiments of the disclosure or the background art will be described below.

DETAILED DESCRIPTION

The terms used in the Detailed Description of the disclosure are only adopted to explain specific embodiments of the disclosure but not intended to limit the disclosure.

Terms "first", "second", "third", "fourth" and the like in the specification, claims and drawings of the disclosure are adopted not to describe a specific sequence but to distinguish different objects. In addition, terms "include" and "have" and any transformations thereof are intended to cover non-exclusive inclusions.

Figure 1:
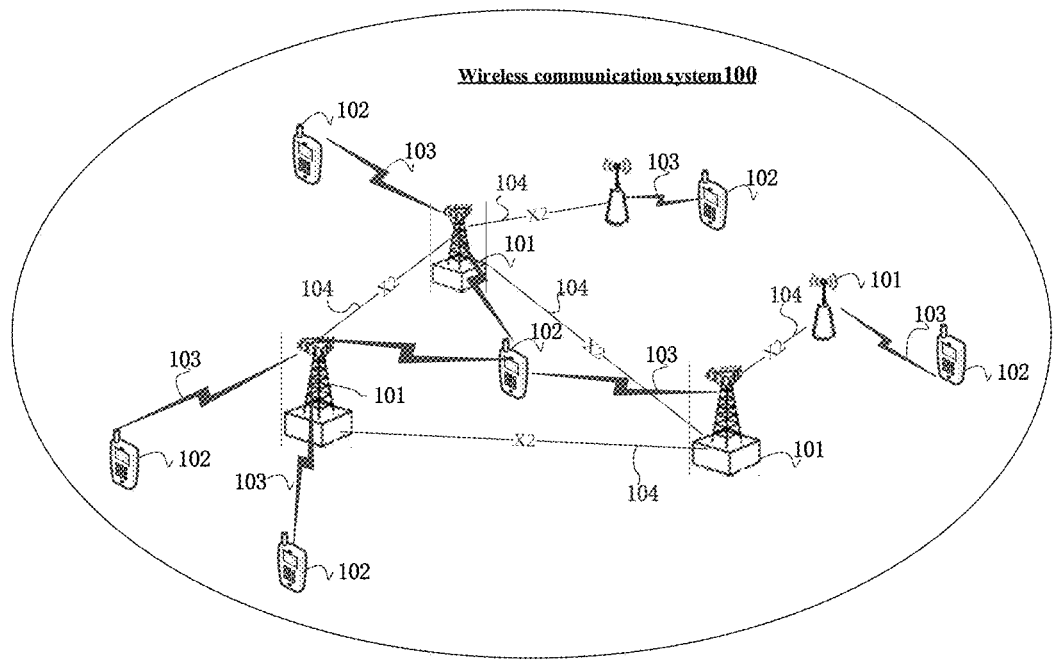
FIG. 1 is a schematic architecture diagram of a wireless communication system according to an embodiment of the disclosure.

FIG. 1 illustrates a wireless communication system involved in the disclosure. The wireless communication system is not limited to a Long Term Evolution (LTE) system, but may also be a future evolved 5th Generation (5G) system, an NR system, a Machine to Machine (M2M) system and the like. As shown in FIG. 1, the wireless communication system 100 may include one or more network devices 101 and one or more UEs 102.

The network device 101 may be a base station, and the base station may be configured to communicate with one or more UEs, and may also be configured to communicate with one or more base stations with part of UE functions (for example, communication between a macro NodeB and a micro NodeB like an Access Point (AP)). The base station may be a Base Transceiver Station (BTS) in a Time Division Synchronous Code Division Multiple Access (TD-SCDMA) system, or may also be an Evolutional Node B (eNB) in the LTE system or a base station in a 5G system or in an NR system. In addition, the base station may also be an AP, a Transmission Reception Point (TRP), a Central Unit (CU) or another network entity, and may include some or all functions of the above network entities.

The UE 102 may be distributed in the whole wireless communication system 100, which may be static or mobile. In some embodiments of the disclosure, the UE 102 may be a mobile device, a mobile station, a mobile unit, an M2M terminal, a wireless unit, a remote unit, a user agent, a mobile client and the like.

The network device 101 may be configured to communicate with the UE 102 through a wireless interface 103 under control of a network device controller (not shown). In some embodiments, the network device controller may be a part of a core network, or may also be integrated into the network device 101. A network device 101 may also directly or indirectly communicate with another network device 101 through a backhaul interface 104 (for example, an X2 interface).

In present discussions about NR, a carrier may include multiple BWPs. For UE 102, only one uplink BWP may be activated for uplink transmission at a moment, while only one downlink BWP may be activated for downlink transmission at a moment. The specific BWP presently activated for the UE 102 is indicated by the network device 101 through DCI, and the BWP for transmission at the UE 102 may be dynamically switched in multiple BWPs in a carrier. If SRS transmission may be dynamically switched on multiple BWPs, how to configure transmission of an SRS is a technical problem to be solved.

In the disclosure, the network device 101 may set a set of SRS parameter configurations for each BWP of the UE 102 at first; then, under the condition that the UE 102 is dynamically switched to a BWP for SRS transmission, the UE 102 may determine the SRS parameter configuration corresponding to the BWP as an SRS parameter configuration used for SRS transmission; and finally, the UE 102 transmits an SRS on the BWP on the basis of the SRS parameter configuration corresponding to the BWP. In such a manner, different SRS parameter configurations may be adopted for SRS transmission on different BWPs, and the flexibility of SRS transmission is further improved.

It is to be noted that the wireless communication system 100 shown in FIG. 1 is only adopted to describe the technical solutions of the disclosure more clearly but not intended to limit the disclosure. Those of ordinary skill in the art should know that, along with evolution of a network architecture and emergence of a new service scenario, the technical solutions provided in the disclosure can also be applied to similar technical problems.

Figure 2:
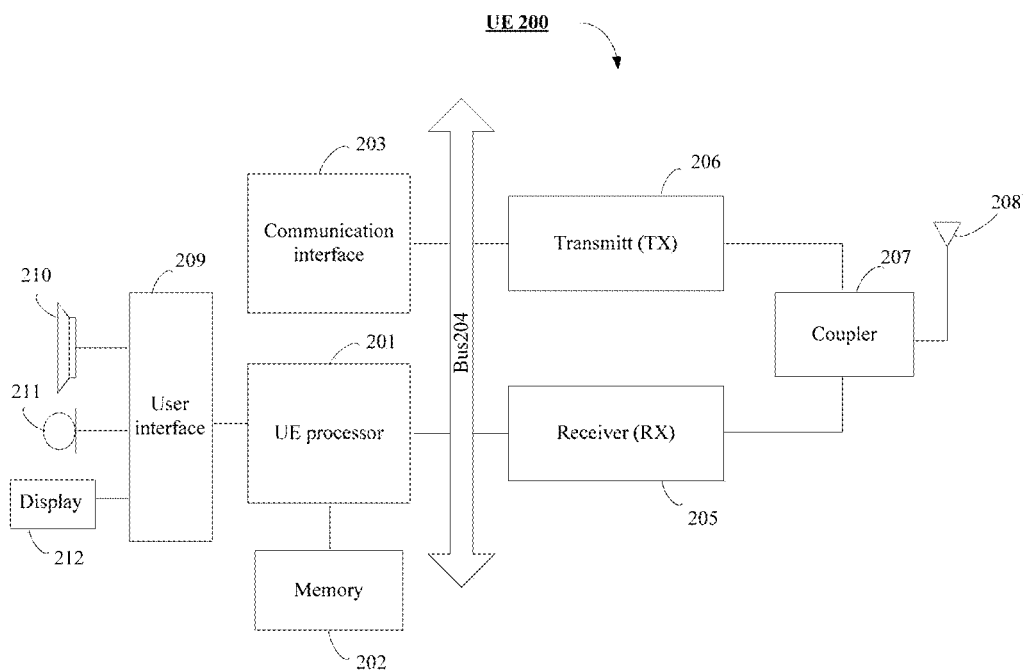
FIG. 2 is a schematic structure diagram of UE according to an embodiment of the disclosure.

Referring to FIG. 2, FIG. 2 illustrates UE 200 according to some embodiments of the disclosure. As shown in FIG. 2, the UE 200 may include one or more UE processors 201, a memory 202, a communication interface 203, a receiver 205, a transmitter 206, a coupler 207, an antenna 208, a user interface 209, and an input/output module (including an audio input/output module 210, a key input module 211, a display 212 and the like). These components may be connected through a bus 204 or in other manners. Connection through the bus 204 is determined as an example in FIG. 2.

The communication interface 203 may be configured for communication between the UE 200 and another communication device, for example, a network device. The network device may be a network device 300 shown in FIG. 3. The communication interface 203 may be an LTE (4th Generation (4G)) communication interface, or may also be a 5G or future NR communication interface. Not limited to a wireless communication interface, the UE 200 may also be configured with a wired communication interface 203, for example, a Local Area Network (LAN) interface.

The transmitter 206 may be configured to perform transmission processing, for example, signal modulation, on a signal output by the UE processor 201. The receiver 205 may be configured to perform reception processing, for example, signal demodulation, on a mobile communication signal received by the antenna 208. In some embodiments of the disclosure, the transmitter 206 and the receiver 205 may be considered as a wireless modem. In the UE 200, there may be one or more transmitters 206 and one or more receivers 205. The antenna 208 may be configured to convert electromagnetic energy in a transmission line into an electromagnetic wave in a free space or convert the electromagnetic wave in the free space into the electromagnetic energy in the transmission line. The coupler 207 is configured to divide the mobile communication signal received by the antenna 208 into multiple paths and allocate the multiple paths of signals to multiple receivers 205.

Besides the transmitter 206 and receiver 205 shown in FIG. 2, the UE 200 may further include other communication components, for example, a Global Positioning System (GPS) module, a Bluetooth module and a Wireless Fidelity (Wi-Fi) module. Not limited to the abovementioned wireless communication signal, the UE 200 may also support another wireless communication signal, for example, a satellite signal and a short wave signal. Not limited to wireless communication, the UE 200 may also be configured with a wired network interface (for example, an LAN interface) to support wired communication.

The input/output module may be configured to implement interaction between the UE 200 and a user/external environment, and may mainly include an audio input/output module 210, a key input module 211, a display 212 and the like. The input/output module may further include a camera, a touch screen, a sensor and the like. Here, the input/output modules all communicate with the UE processor 201 through the user interface 209.

The memory 202 is coupled to the UE processor 201, and is configured to store various software programs and/or multiple sets of instructions. The memory 202 may include a high-speed Random Access Memory (RAM), and may also include a nonvolatile memory, for example, one or more disk storage devices, flash memories or other nonvolatile solid-state storage devices. The memory 202 may store an operating system (called a system for short Hereinafter), for example, an embedded operating system like ANDROID, IOS, WINDOWS or LINUX. The memory 202 may further store a network communication program, and the network communication program may be configured for communication with one or more additional devices, one or more UEs and one or more network devices. The memory 202 may further store a user interface program, and the user interface program may realistically display the content of an application program through a graphical operation interface and receive a control operation from the user over the disclosure program through an input control such as a menu, a dialog box and a button.

In some embodiments of the disclosure, the memory 202 may be configured to store an implementation program for an SRS transmission method provided in one or more embodiments of the disclosure on a UE 200 side. Implementation of the SRS transmission method provided in one or more embodiments of the disclosure refers to the following method embodiment.

In some embodiments of the disclosure, the UE processor 201 may be configured to read and execute a computer-readable instruction. The UE processor 201 may be configured to call the program stored in the memory 212, for example, the implementation program for the SRS transmission method provided in one or more embodiments of the disclosure on the UE 200 side, and execute an instruction included in the program.

It can be understood that the UE 200 may be implemented as a mobile device, a mobile station, a mobile unit, a wireless unit, a remote unit, a user agent, a mobile client and the like.

It is to be noted that the UE 200 shown in FIG. 2 is only an implementation mode of the embodiments of the disclosure and, in a practical application, the UE 200 may further include more or fewer components. There are no limits made here.

Figure 3:
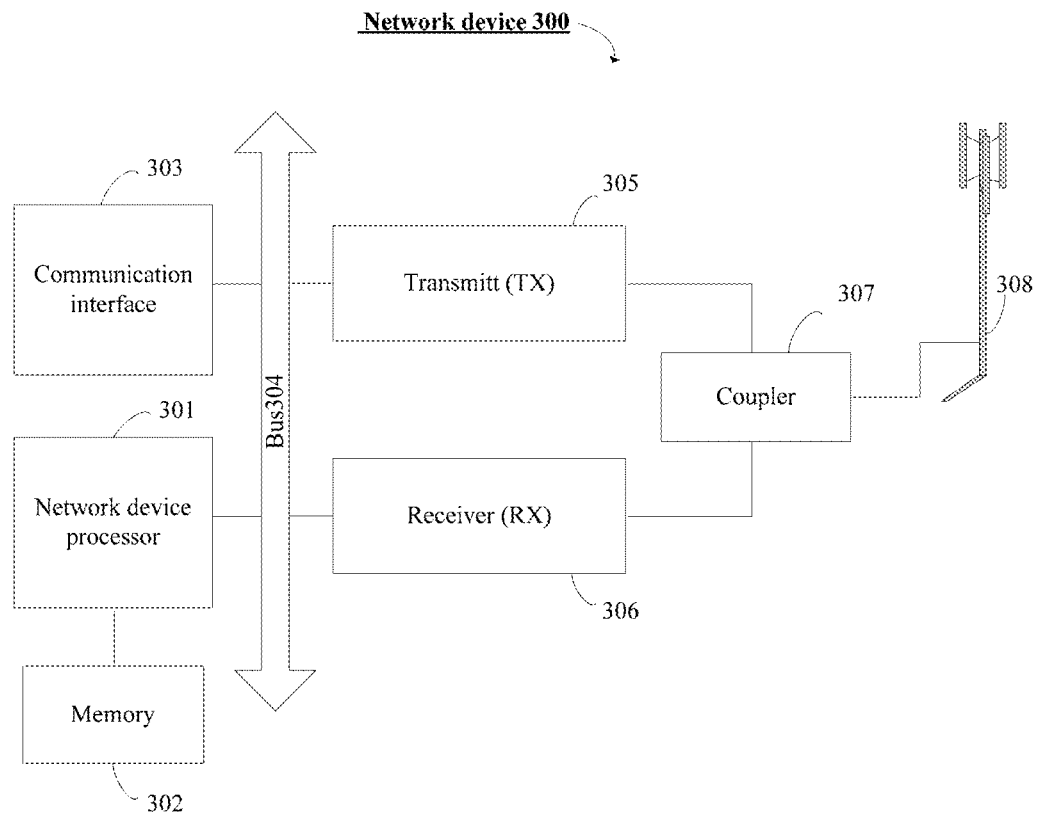
FIG. 3 is a schematic structure diagram of a network device according to an embodiment of the disclosure.

Referring to FIG. 3, FIG. 3 illustrates a network device 300 according to some embodiments of the disclosure. As shown in FIG. 3, the network device 300 may include one or more network device processors 301, a memory 302, a communication interface 303, a transmitter 305, a receiver 306, a coupler 307 and an antenna 308. These components may be connected through a bus 304 or in another manner. Connection through the bus is determined as an example in FIG. 4.

The communication interface 303 may be configured for communication between the network device 300 and another communication device, for example, UE or another network device. The UE may be UE 200 shown in FIG. 2. The communication interface 303 may be an LTE (4G) communication interface, or may also be a 5G or future NR communication interface. Not limited to a wireless communication interface, the network device 300 may also be configured with a wired communication interface 303 to support wired communication. For example, a backhaul link between a network device 300 and another network device 300 may be a wired communication connection.

The transmitter 305 may be configured to perform transmission processing, for example, signal modulation, on a signal output by the network device processor 301. The receiver 306 may be configured to perform reception processing, for example, signal demodulation, on a mobile communication signal received by the antenna 308. In some embodiments of the disclosure, the transmitter 305 and the receiver 306 may be considered as a wireless modem. In the network device 300, there may be one or more transmitters 305 and one or more receivers 306. The antenna 308 may be configured to convert electromagnetic energy in a transmission line into an electromagnetic wave in a free space or convert the electromagnetic wave in the free space into the electromagnetic energy in the transmission line. The coupler 307 may be configured to divide the mobile communication signal into multiple paths to allocate the multiple paths of signals to multiple receivers 306.

The memory 302 is coupled to the network device processor 301, and is configured to store various software programs and/or multiple sets of instructions. The memory 302 may include a high-speed RAM, and may also include a nonvolatile memory, for example, one or more disk storage devices, flash memories or other nonvolatile solid-state storage devices. The memory 302 may store an operating system (called a system for short hereinafter), for example, an embedded operating system like uCOS, VxWorks and RTLinux. The memory 302 may further store a network communication program, and the network communication program may be configured for communication with one or more additional devices, one or more terminal devices and one or more network devices.

The network device processor 301 may be configured to manage a wireless channel, make a call, establish and remove a communication link, and provide cell handover control for a user in a present control region, and the like. The network device processor 301 may include an Administration Module/Communication Module (AM/CM, a center configured for voice path switching and information exchange), a Basic Module (BM) (configured to realize call processing, signaling processing, radio resource management, radio link management and circuit maintenance), a Transcoder and SubMultiplexer (TCSM, configured to realize multiplexing, demultiplexing and transcoding functions) and the like.

In the embodiments of the disclosure, the memory 302 may be configured to store an implementation program for an SRS transmission method provided in one or more embodiments of the disclosure on a network device 300 side. Implementation of the SRS transmission method provided in one or more embodiments of the disclosure refers to the following method embodiments.

In the embodiments of the disclosure, the network device processor 301 may be configured to read and execute a computer-readable instruction. The network device processor 301 may be configured to call the program stored in the memory 302, for example, the implementation program for the SRS transmission method provided in one or more embodiments of the disclosure on the network device 300 side, and execute an instruction included in the program.

It can be understood that the network device 300 may be implemented as a BTS, a wireless transceiver, a Basic Service Set (BSS), an Extended Service Set (ESS), a NodeB, an eNodeB, an AP, a TRP or the like.

It is to be noted that the network device 300 shown in FIG. 3 is only an implementation mode of the embodiments of the disclosure and, during a practical application, the network device 300 may further include more or fewer components. There are no limits made here.

On the basis of the embodiments corresponding to the wireless communication system 100, the UE 200 and the network device 300 respectively, an embodiment of the disclosure provides an SRS transmission method.

Figure 4:
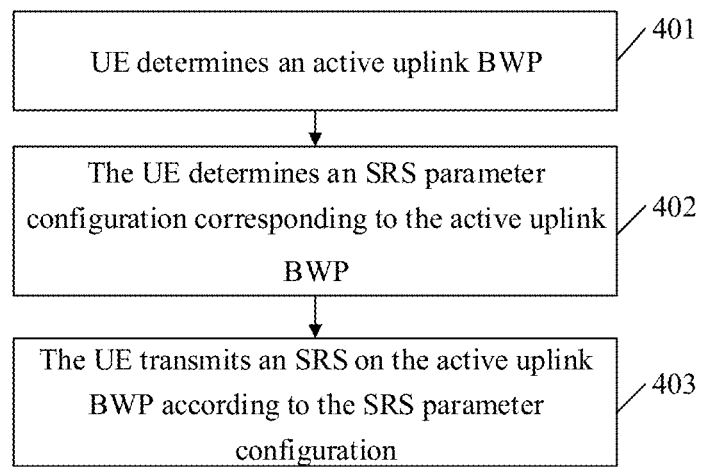
FIG. 4 is a schematic flowchart of an SRS transmission method according to an embodiment of the disclosure.

Referring to FIG. 4, FIG. 4 illustrates a flowchart of an SRS transmission method according to an embodiment of the disclosure. The method includes the following operations.

In operation 401, UE determines an uplink BWP which is presently activated.

In an embodiment of the disclosure, the operation 401 is executed under the condition that the UE is dynamically switched to a BWP for SRS transmission.

In an embodiment of the disclosure, the operation 401 may be implemented in a manner as follows.

The UE determines the active uplink BWP according to BWP indication information. The latest received DCI for scheduling uplink transmission includes the BWP indication information.

Specifically, a network device pre-sets multiple BWPs for the UE through high-layer signaling, and then indicates through the BWP indication information in the DCI that one BWP in the multiple BWPs is activated for transmission. Here, the high-layer signaling may include Radio Resource Control (RRC) signaling, Medium Access Control (MAC) signaling and the like.

For example, a hypothesis is made that the network device pre-sets four BWPs and bandwidths corresponding to the four BWPs for the UE through RRC signaling and then the network device indicates the activated BWP through the DCI, the DCI including 2 bit BWP indication information. For example, assuming that the four BWPs are BWP1, BWP2, BWP3 and BWP4 and the 2 bit BWP indication information is 00, the active uplink BWP is BWP1. If the 2 bit BWP indication information is 11, the active uplink BWP is BWP4, and so on.

In an embodiment of the disclosure, the DCI may be configured to trigger aperiodic SRS transmission on the active uplink BWP.

In the operation 402, the UE determines an SRS parameter configuration corresponding to the active uplink BWP.

In an embodiment of the disclosure, the method further includes the following operation.

The UE receives high-layer signaling from a network device. The high-layer signaling is for setting an SRS parameter configuration respectively for each uplink BWP of the UE.

A specific implementation mode of the operation 402 includes that: the UE determines the SRS parameter configuration corresponding to the active uplink BWP according to the high-layer signaling.

Here, the high-layer signaling may include RRC signaling, MAC signaling and the like.

The network device pre-sets the bandwidths (i.e., Physical Resource Blocks (PRBs) occupied by the four BWPs respectively) corresponding to the four BWPs for the UE through high-layer signaling, and then sets SRS parameter configurations for the four BWPs through another high-layer signaling respectively. Or, the network device pre-sets the bandwidths (i.e., the PRBs occupied by the four BWPs respectively) corresponding to the four BWPs for the UE and sets the SRS parameter configurations for the four BWPs respectively through the same high-layer signaling.

For example, the four BWPs are BWP1, BWP2, BWP3 and BWP4. A hypothesis is made that the network device sets an SRS parameter configuration 1 for BWP1 through high-layer signaling, the network device sets an SRS parameter configuration 2 for BWP2, the network device sets an SRS parameter configuration 3 for BWP3 and the network device sets an SRS parameter configuration 4 for BWP4. Assuming that the active uplink BWP is BWP1, the UE may obtain according to the high-layer signaling that the SRS parameter configuration corresponding to BWP1 is the SRS parameter configuration 1, and so on.

In the operation 403, the UE transmits an SRS on the uplink BWP according to the SRS parameter configuration.

In an embodiment of the disclosure, the SRS parameter configuration includes a configuration of at least one SRS resource set in the uplink BWP and/or a configuration of at least one SRS resource in the uplink BWP.

In an embodiment of the disclosure, the configuration of the SRS resource set includes at least one of: a power control parameter configuration of the SRS resource set, a usage configuration of the SRS resource set, an aperiodic triggering state corresponding to the SRS resource set, or a Channel State Information Reference Signal (CSI-RS) resource configuration associated with the SRS resource set.

Here, the power control parameter configuration of the SRS resource set includes at least one of: an open loop power control parameter configuration, a closed loop power control parameter configuration, or a path loss parameter configuration.

Here, the usage configuration of the SRS resource set is for indicating a usage corresponding to the SRS resource set. The usage corresponding to the SRS resource set includes at least one of: indication of beam management, codebook-based transmission, non-codebook-based transmission, antenna switching and the like.

Here, the aperiodic triggering state corresponding to the SRS resource set represents that aperiodic transmission of the SRS resource set is needed to be triggered. Specifically, in case that SRS triggering signaling in the DCI indicates an aperiodic triggering state, the UE is required to perform aperiodic SRS transmission on one or more SRS resource sets corresponding to the aperiodic triggering state.

In an embodiment of the disclosure, the configuration of the SRS resource includes at least one of: a time-frequency resource configuration of the SRS resource, a sequence configuration of the SRS resource, an antenna port configuration of the SRS resource, a periodicity configuration of the SRS resource, a spatial relation configuration of the SRS resource, or an aperiodic triggering state corresponding to the SRS resource.

In an embodiment of the disclosure, the method further includes the following operation:

under the condition that the DCI indicating activation of the uplink BWP includes aperiodic SRS triggering signaling, the UE determines at least one SRS resource set corresponding to the uplink BWP as an SRS resource set which carries SRS transmission triggered by the aperiodic SRS triggering signaling.

For example, there is made such a hypothesis that the DCI indicating activation of the uplink BWP is DCI-1 and DCI-1 includes the aperiodic SRS triggering signaling. Assuming the SRS resource set corresponding to the uplink BWP is an SRS resource set 1 and SRS transmission triggered by the aperiodic SRS triggering signaling is SRS transmission 1, the UE determines the SRS resource set 1 as an SRS resource set which carries SRS transmission 1. For another example, there is made such a hypothesis that the DCI indicating activation of the uplink BWP is DCI-1 and DCI-1 includes the aperiodic SRS triggering signaling. Assuming the SRS resource set corresponding to the uplink BWP is the SRS resource set 1 and an SRS resource set 2 and SRS transmission triggered by the aperiodic SRS triggering signaling is SRS transmission 1, the UE determines the SRS resource set 1 and the SRS resource set 2 or one of them as the SRS resource set which carries SRS transmission 1.

In an embodiment of the disclosure, a specific implementation mode of the operation that the UE determines the at least one SRS resource set corresponding to the uplink BWP as the SRS resource set which carries SRS transmission triggered by the aperiodic SRS triggering signaling includes the following operation:

the UE determines an SRS resource set indicated by the aperiodic SRS triggering signaling as the SRS resource set which carries SRS transmission triggered by the aperiodic SRS triggering signaling.

Specifically, assuming the DCI includes both of the BWP indication information and the aperiodic SRS triggering signaling and the uplink BWP indicated by the BWP indication information includes at least one SRS resource set, the UE determines the SRS resource set indicated by the aperiodic SRS triggering signaling in the at least one SRS resource set as the SRS resource set which carries SRS transmission triggered by the aperiodic SRS triggering signaling.

For example, assuming the uplink BWP indicated by the BWP indication information includes three SRS resource sets, the DCI sent to the UE by the network device includes 2 bit aperiodic triggering signaling and each of three state in the 2 bit aperiodic triggering signaling respectively corresponds to one SRS resource set in the three SRS resource sets, the UE may determine the corresponding SRS resource set according to a state indicated by the 2 bit aperiodic triggering signaling and then configure the determined SRS resource set to carry SRS transmission triggered by the aperiodic SRS triggering signaling. For example, there is made such a hypothesis that 00 corresponds to an SRS resource set 1, 01 corresponds to an SRS resource set 2, 10 corresponds to an SRS resource set 3 and 11 corresponds to no triggering of an aperiodic SRS. Assuming the 2 bit aperiodic SRS triggering signaling in the DCI sent to the UE by the network device is 11, then the UE determines the SRS resource set 3 as the SRS resource set which carries SRS transmission triggered by the 2 bit aperiodic SRS triggering signaling according to the 2 bit aperiodic SRS triggering signaling.

For another example, the UE starts periodic SRS transmission in BWP1 according to the SRS resource configuration corresponding to BWP1, and the UE, after receiving the DCI including the BWP indication information, is required to be switched to BWP2 indicated by the BWP indication information and then performs periodic SRS transmission according to the SRS resource configuration corresponding to BWP2. The SRS resource configurations corresponding to BWP1 and BWP2 are pre-configured by the network device through the high-layer signaling respectively, and SRS resources corresponding to BWP1 and BWP2 may have different periods and time slot offsets.

In an embodiment of the disclosure, the SRS parameter configuration includes the power control parameter configuration of the SRS resource set, and a specific implementation mode of the operation that the UE transmits the SRS on the uplink BWP according to the SRS parameter configuration includes the following operation:

the UE determines transmitted power for SRS transmission on the SRS resource set according to the power control parameter configuration of the SRS resource set; the UE transmits the SRS on the uplink BWP according to the determined transmitted power.

For example, assuming the power control parameter configuration of the SRS resource set corresponding to the uplink BWP is x and the transmitted power determined by the UE according to the configuration is P, the UE determines that the transmitted power for SRS transmission on the SRS resource set in the uplink BWP is P.

In an embodiment of the disclosure, the SRS parameter configuration includes the usage configuration of the SRS resource set, and a specific implementation mode of the operation that the UE transmits the SRS on the uplink BWP according to the SRS parameter configuration includes the following operation:

the UE determines an antenna port, a transmission beam or an SRS resource number for SRS transmission on the SRS resource set according to the usage configuration of the SRS resource set; the UE transmits the SRS on the uplink BWP according to the determined antenna port, transmission beam or SRS resource number.

Specifically, assuming the usage configuration of the SRS resource set is beam management, the UE determines that the antenna port for SRS transmission is 1, 2 or 4, and in addition, different SRS resources in the SRS resource set may adopt different beams to transmit the SRS.

Assuming the usage configuration of the SRS resource set is codebook transmission, the UE determines that the antenna port for SRS transmission is 1, 2 or 4, and in addition, the SRS resource set includes at most two SRS resources.

Assuming the usage configuration of the SRS resource set is non-codebook transmission, the UE determines that the antenna port for SRS transmission is 1, and in addition, the SRS resource set includes at most two SRS resources.

Assuming the usage configuration of the SRS resource set is antenna switching, the UE determines that the antenna port for SRS transmission is 1 or 2, the SRS resource set includes at most two SRS resources, and different SRS resources correspond to different antenna ports.

In an embodiment of the disclosure, the SRS parameter configuration includes the aperiodic triggering state corresponding to the SRS resource set, and a specific implementation mode of the operation that the UE transmits the SRS on the uplink BWP according to the SRS parameter configuration includes the following operation:

the UE determines the SRS resource set for aperiodic SRS transmission on the uplink BWP according to the aperiodic triggering state corresponding to the SRS resource set and the aperiodic SRS triggering signaling. The UE transmits the SRS on the uplink BWP according to the determined SRS resource set.

For example, assuming the network device pre-sets three SRS resource sets for the UE through high-layer signaling, an aperiodic triggering state corresponding to the SRS resource set 1 is 00, an aperiodic triggering state corresponding to the SRS resource set 2 is 01 and an aperiodic triggering state corresponding to the SRS resource set 3 is 10, the UE determines a target SRS resource set for aperiodic SRS transmission on the uplink BWP from the three sets according to the state indicated by the aperiodic SRS triggering signaling. For example, if the state indicated by the aperiodic SRS triggering signaling is 00, then the target SRS resource set is the SRS resource set 1. For another example, if the state indicated by the aperiodic SRS triggering signaling is 10, then the target SRS resource set is the SRS resource set 3, and so on.

In an embodiment of the disclosure, the SRS parameter configuration includes the CSI-RS resource configuration associated with the SRS resource set, and a specific implementation mode of the operation that the UE transmits the SRS on the uplink BWP according to the SRS parameter configuration includes the following operation:

the UE determines a beam and/or precoding matrix for SRS transmission on the SRS resource set according to the CSI-RS resource configuration associated with the SRS resource set; the UE transmits the SRS on the uplink BWP according to the determined beam and/or precoding matrix.

The UE obtains downlink channel information according to the CSI-RS resource configuration, and then the UE calculates the beam and/or precoding matrix for SRS transmission on the basis of the obtained downlink channel information and channel reciprocity, and finally uses the calculated beam and/or precoding matrix for SRS transmission on the SRS resource set in the uplink BWP.

In an embodiment of the disclosure, the SRS parameter configuration includes the aperiodic triggering state corresponding to the SRS resource, and a specific implementation mode of the operation that the UE transmits the SRS on the uplink BWP according to the SRS parameter configuration includes the following operation:

the UE determines the SRS resource for aperiodic SRS transmission on the uplink BWP according to the aperiodic triggering state corresponding to the SRS resource and the aperiodic SRS triggering signaling; the UE transmits the SRS on the uplink BWP according to the determined SRS resource.

For example, if the network device pre-sets five SRS resources for the UE, an aperiodic triggering state corresponding to the SRS resource 1 and the SRS resource 3 is 00, an aperiodic triggering state corresponding to the SRS resource 2 and the SRS resource 4 is 01 and an aperiodic triggering state corresponding to the SRS resource 5 is 10, then the UE determines a target SRS resource for aperiodic SRS transmission on the uplink BWP from the five SRS resources according to the state indicated by the aperiodic SRS triggering signaling. For example, if the state indicated by the aperiodic SRS triggering signaling is 00, then the target SRS resource set is the SRS resource 1 and the SRS resource 3. If the state indicated by the aperiodic SRS triggering signaling is 10, the target SRS resource is the SRS resource 5, and so on.

In an embodiment of the disclosure, the SRS parameter configuration includes the time-frequency resource configuration of the SRS resource, and a specific implementation mode of the operation that the UE transmits the SRS on the uplink BWP according to the SRS parameter configuration includes the following operation:

the UE determines a bandwidth for SRS transmission in the SRS resource according to the time-frequency resource configuration of the SRS resource and a bandwidth of the uplink BWP; the UE transmits the SRS on the uplink BWP according to the determined bandwidth.

The time-frequency resource configuration of the SRS resource includes an SRS bandwidth configuration and/or SRS frequency-domain frequency hopping configuration of the SRS resource. The UE determines a maximum transmission bandwidth for SRS transmission in the SRS resource according to the bandwidth of the uplink BWP. Within a range of the maximum transmission bandwidth, the UE determines the bandwidth for SRS transmission in the SRS resource according to the SRS bandwidth configuration or the SRS frequency-domain frequency hopping configuration, and then transmits the SRS on the uplink BWP according to the determined bandwidth.

In an embodiment of the disclosure, the SRS parameter configuration includes a spatial relation parameter of the SRS resource, and a specific implementation mode of the operation that the UE transmits the SRS on the uplink BWP according to the SRS parameter configuration includes the following operation:

the UE determines a target SRS resource, a CSI-RS resource or a Synchronization Signal Block (SSB) spatially correlated with the SRS resource according to the spatial relation parameter of the SRS resource;

the UE determines a transmission beam of the SRS resource according to the target SRS resource, the CSI-RS resource or the SSB; and the UE transmits the SRS on the uplink BWP according to the determined transmission beam.

Furthermore, a specific implementation mode of the operation that the UE determines the transmission beam of the SRS resource according to the target SRS resource, the CSI-RS resource or the SSB includes the following operation:

the UE determines a transmission beam of the target SRS resource as the transmission beam of the SRS resource; or, the UE determines a transmission beam of the CSI-RS resource as the transmission beam of the SRS resource; or, the UE determines a transmission beam of the SSB as the transmission beam of the SRS resource.

In an embodiment of the disclosure, the SRS parameter configuration includes the sequence configuration of the SRS resource, and a specific implementation mode of the operation that the UE transmits the SRS on the uplink BWP according to the SRS parameter configuration includes the following operation:

the UE determines an SRS sequence for SRS transmission on the SRS resource according to the sequence configuration of the SRS resource; the UE transmits the SRS on the uplink BWP according to the determined SRS sequence.

In an embodiment of the disclosure, the SRS parameter configuration includes the periodicity configuration of the SRS resource, and a specific implementation mode of the operation that the UE transmits the SRS on the uplink BWP according to the SRS parameter configuration includes the following operation:

the UE determines a periodicity operation for SRS transmission on the SRS resource according to the periodicity configuration of the SRS resource. The UE transmits the SRS on the uplink BWP according to the determined periodicity operation.

Assuming the periodicity configuration of the SRS resource is periodic, then the UE periodically transmits the SRS on the uplink BWP. If the periodicity configuration of the SRS resource is quasi-continuous, then the UE quasi-continuously transmits the SRS on the uplink BWP. If the periodicity configuration of the SRS resource is aperiodic, then the UE aperiodically transmits the SRS on the uplink BWP.

It can be seen that, in the disclosure, the network device may set a set of SRS parameter configurations for each BWP of the UE; then, under the condition that the UE is dynamically switched to a BWP for SRS transmission, the UE may determine the SRS parameter configuration corresponding to the BWP as the SRS parameter configuration for SRS transmission; and finally, the UE transmits the SRS on the BWP on the basis of the SRS parameter configuration corresponding to the BWP. In such a manner, different SRS parameter configurations may be adopted for SRS transmission on different BWPs, and SRS transmission flexibility is further improved.

It is to be noted that the examples in the disclosure are only adopted for explanation but should not form any limit.

Figure 5:
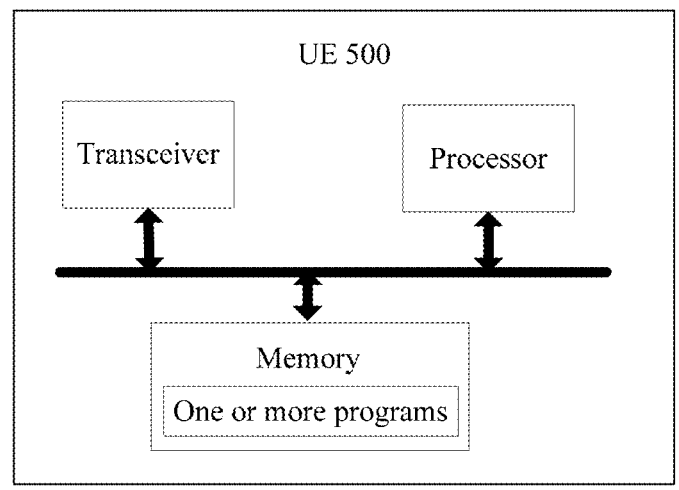
FIG. 5 is a schematic structure diagram of another UE according to an embodiment of the disclosure.

Referring to FIG. 5, FIG. 5 illustrates UE 500 according to an embodiment of the disclosure. The UE 500 includes one or more processors, one or more memories, one or more transceivers and one or more programs.

The one or more programs are stored in the memory and are configured to be executed by the one or more processors.

The programs include instructions configured to execute the following steps:

an uplink BWP which is presently activated is determined.

an SRS parameter configuration corresponding to the active uplink BWP is determined; and an SRS is transmitted on the uplink BWP according to the SRS parameter configuration.

In an embodiment of the disclosure, in terms of determining the active uplink BWP, the programs include an instruction configured to execute the following step:

the active uplink BWP is determined according to BWP indication information, and the latest received DCI for scheduling uplink transmission includes the BWP indication information.

In an embodiment of the disclosure, the programs include an instruction further configured to execute the following step:

high-layer signaling sent by a network device is received, the high-layer signaling being used for setting a corresponding SRS parameter configuration for each uplink BWP of the UE.

In terms of determining the SRS parameter configuration corresponding to the active uplink BWP, the programs include an instruction configured to execute the following step:

the SRS parameter configuration corresponding to the active uplink BWP is determined according to the high-layer signaling.

In an embodiment of the disclosure, the SRS parameter configuration includes a configuration of at least one SRS resource set in the uplink BWP and/or a configuration of at least one SRS resource in the uplink BWP.

In an embodiment of the disclosure, the configuration of the SRS resource set includes at least one of: a power control parameter configuration of the SRS resource set, a usage configuration of the SRS resource set, an aperiodic triggering state corresponding to the SRS resource set, or a CSI-RS resource configuration associated with the SRS resource set.

In an embodiment of the disclosure, the configuration of the SRS resource includes at least one of: a time-frequency resource configuration of the SRS resource, a sequence configuration of the SRS resource, an antenna port configuration of the SRS resource, a period configuration of the SRS resource, a spatial relation configuration of the SRS resource, or an aperiodic triggering state corresponding to the SRS resource.

In an embodiment of the disclosure, the programs include an instruction further configured to execute the following step:

under the condition that the DCI indicating activation of the uplink BWP includes aperiodic SRS triggering signaling, at least one SRS resource set corresponding to the uplink BWP is determined as an SRS resource set which carries SRS transmission triggered by the aperiodic SRS triggering signaling.

In an embodiment of the disclosure, in terms of determining at least one SRS resource set corresponding to the uplink BWP as the SRS resource set which carries SRS transmission triggered by the aperiodic SRS triggering signaling, the programs include an instruction configured to execute the following step:

an SRS resource set indicated by the aperiodic SRS triggering signaling is determined as the SRS resource set which carries SRS transmission triggered by the aperiodic SRS triggering signaling.

In an embodiment of the disclosure, the SRS parameter configuration includes the power control parameter configuration of the SRS resource set; and in terms of transmitting the SRS on the uplink BWP according to the SRS parameter configuration, the programs include instructions configured to execute the following steps:

the transmitted power for SRS transmission on the SRS resource set is determined according to the power control parameter configuration of the SRS resource set; and the SRS is transmitted on the uplink BWP according to the determined transmitted power.

In an embodiment of the disclosure, the SRS parameter configuration includes the usage configuration of the SRS resource set; and in terms of transmitting the SRS on the uplink BWP according to the SRS parameter configuration, the programs include instructions configured to execute the following steps:

an antenna port, a transmission beam or an SRS resource number for SRS transmission on the SRS resource set is determined according to the usage configuration of the SRS resource set; and the SRS is transmitted on the uplink BWP according to the determined antenna port, transmission beam or SRS resource number.

In an embodiment of the disclosure, the SRS parameter configuration includes the aperiodic triggering state corresponding to the SRS resource set; and in terms of transmitting the SRS on the uplink BWP according to the SRS parameter configuration, the programs include instructions configured to execute the following steps:

an SRS resource set for aperiodic SRS transmission on the uplink BWP is determined according to the aperiodic triggering state corresponding to the SRS resource set and the aperiodic SRS triggering signaling; and the SRS is transmitted on the uplink BWP according to the determined SRS resource set.

In an embodiment of the disclosure, the SRS parameter configuration includes the CSI-RS resource configuration associated with the SRS resource set; and in terms of transmitting the SRS on the uplink BWP according to the SRS parameter configuration, the programs include instructions configured to execute the following steps:

a beam and/or precoding matrix for SRS transmission on the SRS resource set are/is determined according to the CSI-RS resource configuration associated with the SRS resource set; and the SRS is transmitted on the uplink BWP according to the determined beam and/or precoding matrix.

In an embodiment of the disclosure, the SRS parameter configuration includes the aperiodic triggering state corresponding to the SRS resource; and in terms of transmitting the SRS on the uplink BWP according to the SRS parameter configuration, the programs include instructions configured to execute the following steps:

an SRS resource for aperiodic SRS transmission on the uplink BWP is determined according to the aperiodic triggering state corresponding to the SRS resource and the aperiodic SRS triggering signaling;

the SRS is transmitted on the uplink BWP according to the determined SRS resource.

In an embodiment of the disclosure, the SRS parameter configuration includes the time-frequency resource configuration of the SRS resource; and in terms of transmitting the SRS on the uplink BWP according to the SRS parameter configuration, the programs include instructions configured to execute the following steps:

a bandwidth for SRS transmission on the SRS resource is determined according to the time-frequency resource configuration of the SRS resource and a bandwidth of the uplink BWP; and the SRS is transmitted on the uplink BWP according to the determined bandwidth.

In an embodiment of the disclosure, the SRS parameter configuration includes a spatial relation parameter of the SRS resource; and in terms of transmitting the SRS on the uplink BWP according to the SRS parameter configuration, the programs include instructions configured to execute the following steps:

a target SRS resource, a CSI-RS resource or an SSB spatially correlated with the SRS resource is determined according to the spatial relation parameter of the SRS resource;

a transmission beam of the SRS resource is determined according to the target SRS resource, the CSI-RS resource or the SSB; and the SRS is transmitted on the uplink BWP according to the determined transmission beam.

In an embodiment of the disclosure, the SRS parameter configuration includes the sequence configuration of the SRS resource; and in terms of transmitting the SRS on the uplink BWP according to the SRS parameter configuration, the programs include instructions configured to execute the following steps:

an SRS sequence for SRS transmission on the SRS resource is determined according to the sequence configuration of the SRS resource; and the SRS is transmitted on the uplink BWP according to the determined SRS sequence.

In an embodiment of the disclosure, the SRS parameter configuration includes the periodicity configuration of the SRS resource; and in terms of transmitting the SRS on the uplink BWP according to the SRS parameter configuration, the programs include instructions configured to execute the following steps:

a periodicity operation for SRS transmission on the SRS resource is determined according to the periodicity configuration of the SRS resource; and the SRS is transmitted on the uplink BWP according to the determined periodicity operation.

It is to be noted that specific implementation modes of the contents of the embodiment may refer to the abovementioned method and will not be elaborated herein.

Figure 6:
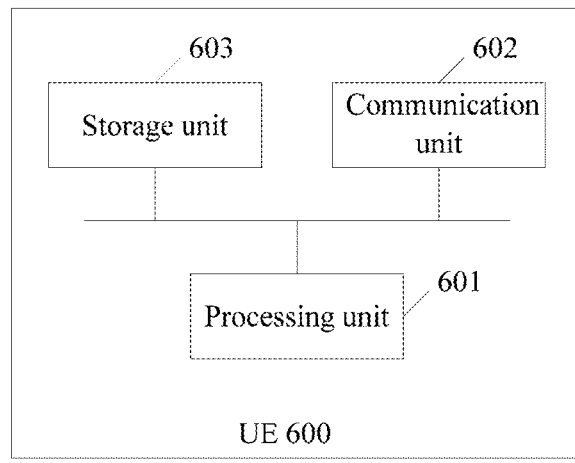
FIG. 6 is a schematic structure diagram of still another UE according to an embodiment of the disclosure.

Referring to FIG. 6, FIG. 6 illustrates UE 600 according to an embodiment of the disclosure. The UE 600 includes a processing unit 601, a communication unit 602 and a storage unit 603.

The processing unit 601 is configured to determine an uplink BWP which is presently activated.

The processing unit 601 is further configured to determine an SRS parameter configuration corresponding to the active uplink BWP.

The processing unit 601 is further configured to transmit an SRS on the uplink BWP through the communication unit 602 according to the SRS parameter configuration.

In an embodiment of the disclosure, in terms of determining the active uplink BWP, the processing unit 601 is configured to:

determine the active uplink BWP according to BWP indication information;

here, the latest received DCI for scheduling uplink transmission includes the BWP indication information.

In an embodiment of the disclosure, the processing unit 601 is further configured to receive high-layer signaling sent by a network device through the communication unit 602, the high-layer signaling being used to set an SRS parameter configuration respectively for each uplink BWP of the UE.

In terms of determining the SRS parameter configuration corresponding to the active uplink BWP, the processing unit 601 is configured to determine the SRS parameter configuration corresponding to the active uplink BWP according to the high-layer signaling.

In an embodiment of the disclosure, the SRS parameter configuration includes a configuration of at least one SRS resource set in the uplink BWP and/or a configuration of at least one SRS resource in the uplink BWP.

In an embodiment of the disclosure, the configuration of the SRS resource set includes at least one of: a power control parameter configuration of the SRS resource set, a usage configuration of the SRS resource set, an aperiodic triggering state corresponding to the SRS resource set, or a CSI-RS resource configuration associated with the SRS resource set.

In an embodiment of the disclosure, the configuration of the SRS resource includes at least one of: a time-frequency resource configuration of the SRS resource, a sequence configuration of the SRS resource, an antenna port configuration of the SRS resource, a period configuration of the SRS resource, a spatial relation configuration of the SRS resource, or an aperiodic triggering state corresponding to the SRS resource.

In an embodiment of the disclosure, the processing unit 601 is further configured to, under the condition that the DCI indicating activation of the uplink BWP includes aperiodic SRS triggering signaling, determine at least one SRS resource set corresponding to the uplink BWP as an SRS resource set which carries SRS transmission triggered by the aperiodic SRS triggering signaling.

In an embodiment of the disclosure, in terms of determining the at least one SRS resource set corresponding to the uplink BWP as the SRS resource set which carries SRS transmission triggered by the aperiodic SRS triggering signaling, the processing unit 601 is configured to determine an SRS resource set indicated by the aperiodic SRS triggering signaling as the SRS resource set which carries SRS transmission triggered by the aperiodic SRS triggering signaling.

In an embodiment of the disclosure, the SRS parameter configuration includes the power control parameter configuration of the SRS resource set; and in terms of transmitting the SRS on the uplink BWP according to the SRS parameter configuration, the processing unit 601 is configured to:

determine transmitted power for SRS transmission on the SRS resource set according to the power control parameter configuration of the SRS resource set; and transmit the SRS on the uplink BWP according to the determined transmitted power.

In an embodiment of the disclosure, the SRS parameter configuration includes the usage configuration of the SRS resource set; and in terms of transmitting the SRS on the uplink BWP according to the SRS parameter configuration, the processing unit 601 is configured to:

determine an antenna port, a transmission beam or an SRS resource number for SRS transmission on the SRS resource set according to the usage configuration of the SRS resource set; and transmit the SRS on the uplink BWP according to the determined antenna port, transmission beam or SRS resource number.

In an embodiment of the disclosure, the SRS parameter configuration includes the aperiodic triggering state corresponding to the SRS resource set; and in terms of transmitting the SRS on the uplink BWP according to the SRS parameter configuration, the processing unit 601 is configured to:

determine an SRS resource set for aperiodic SRS transmission on the uplink BWP according to the aperiodic triggering state corresponding to the SRS resource set and the aperiodic SRS triggering signaling; and transmit the SRS on the uplink BWP according to the determined SRS resource set.

In an embodiment of the disclosure, the SRS parameter configuration includes the CSI-RS resource configuration associated with the SRS resource set; and in terms of transmitting the SRS on the uplink BWP according to the SRS parameter configuration, the processing unit 601 is configured to:
    determine a beam and/or precoding matrix for SRS transmission on the SRS resource set determined according to the CSI-RS resource configuration associated with the SRS resource set, and
    transmit the SRS on the uplink BWP according to the determined beam and/or precoding matrix.

In an embodiment of the disclosure, the SRS parameter configuration includes the aperiodic triggering state corresponding to the SRS resource; and in terms of transmitting the SRS on the uplink BWP according to the SRS parameter configuration, the processing unit 601 is configured to:
    determine an SRS resource for aperiodic SRS transmission on the uplink BWP according to the aperiodic triggering state corresponding to the SRS resource and the aperiodic SRS triggering signaling, and
    transmit the SRS on the uplink BWP according to the determined SRS resource.

In an embodiment of the disclosure, the SRS parameter configuration includes the time-frequency resource configuration of the SRS resource, and in terms of transmitting the SRS on the uplink BWP according to the SRS parameter configuration, the processing unit 601 is configured to:
    determine a bandwidth for SRS transmission on the SRS resource according to the time-frequency resource configuration of the SRS resource and a bandwidth of the uplink BWP, and
    transmit the SRS on the uplink BWP according to the determined bandwidth.

In an embodiment of the disclosure, the SRS parameter configuration includes a spatial relation parameter of the SRS resource, and in terms of transmitting the SRS on the uplink BWP according to the SRS parameter configuration, the processing unit 601 is configured to:
    determine a target SRS resource, a CSI-RS resource or an SSB spatially correlated with the SRS resource according to the spatial relation parameter of the SRS resource,
    determine a transmission beam of the SRS resource is determined according to the target SRS resource, the CSI-RS resource or the SSB, and
    transmit the SRS on the uplink BWP according to the determined transmission beam.

In an embodiment of the disclosure, the SRS parameter configuration includes the sequence configuration of the SRS resource, and in terms of transmitting the SRS on the uplink BWP according to the SRS parameter configuration, the processing unit 601 is configured to:
    determine an SRS sequence for SRS transmission on the SRS resource according to the sequence configuration of the SRS resource, and
    transmit the SRS on the uplink BWP according to the determined SRS sequence.

In an embodiment of the disclosure, the SRS parameter configuration includes the periodicity configuration of the SRS resource, and in terms of transmitting the SRS on the uplink BWP according to the SRS parameter configuration, the processing unit 601 is configured to:
    determine a periodicity operation for SRS transmission on the SRS resource according to the periodicity configuration of the SRS resource, and
    transmit the SRS on the uplink BWP according to the determined periodicity operation.

Here, the processing unit 601 may be a processor or a controller (which may be, for example, a Central Processing Unit (CPU), a universal processor, a Digital Signal Processor (DSP), an Application-Specific Integrated Circuit (ASIC), a Field Programmable Gate Array (FPGA) or another programmable logical device, transistor logical device, hardware component or any combination thereof the processing unit 601 may implement or execute various exemplary logical blocks, modules and circuits described in combination with the contents disclosed in the disclosure. The processor may also be a combination incapable of realizing a calculation function (for example, a combination including one or more microprocessors, or a combination of a DSP and a microprocessor). The communication unit 602 may be a transceiver, a transceiver circuit, a radio frequency chip, a communication interface and the like. The storage unit 603 may be a memory.

When the processing unit 601 is a processor, the communication unit 602 is a communication interface and the storage unit 603 is a memory, the UE involved in the embodiment of the disclosure may be the UE shown in FIG. 5.

An embodiment of the disclosure also provides a computer-readable storage medium, which stores a computer program configured for electronic data exchange, the computer program enabling a computer to execute part of or all of the steps executed by the first network device in the abovementioned methods.

An embodiment of the disclosure also provides a computer program product. The computer program product includes a non-transitory computer-readable storage medium storing a computer program. The computer program may be operated to enable a computer to execute part of or all of the steps executed by the first network device in the abovementioned methods. The computer program product may be a software installation package.

The steps of the method or algorithm described in the embodiments of the disclosure may be implemented in a hardware manner, or may also be implemented in a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist as discrete components in an access network device, a target network device or a core network device.

Those skilled in the art may realize that, in one or more abovementioned examples, all or part of the functions described in the embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible by the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementation modes further describe the purposes, technical solutions and beneficial effects of the embodiments of the disclosure in detail. It is to be understood that the above is only the specific implementation mode of the embodiments of the disclosure and not intended to limit the scope of protection of the embodiments of the disclosure. Any modifications, equivalent replacements, improvements and the like made on the basis of the technical solutions of the embodiments of the disclosure shall fall within the scope of protection of the embodiments of the disclosure.

The invention claimed is:

1. A method for Sounding Reference Signal (SRS) transmission, comprising:
   receiving, by User Equipment (UE), high-layer signaling, wherein the high-layer signaling is used for setting at least one SRS parameter configuration respectively for each of a plurality of uplink BWPs of the UE;
   determining, by the UE, an active uplink Bandwidth Part (BWP) among the plurality of uplink BWPs;
   determining, by the UE, an SRS parameter configuration corresponding to the active uplink BWP according to the high-layer signaling, wherein the SRS parameter configuration corresponding to the active uplink BWP comprises a configuration of at least one SRS resource set in the active uplink BWP and a configuration of at least one SRS resource in the active uplink BWP; and
   transmitting, by the UE, an SRS in the active uplink BWP according to the SRS parameter configuration.

2. The method of claim 1, wherein determining, by the UE, the active uplink BWP comprises:
   determining, by the UE, the active uplink BWP according to BWP indication information, wherein latest received Downlink Control Information (DCI) for scheduling uplink transmission comprises the BWP indication information.

3. The method of claim 1, wherein the configuration of the at least one SRS resource set comprises at least one of a power control parameter configuration of the at least one SRS resource set, a usage configuration of the at least one SRS resource set, an aperiodic triggering state corresponding to the at least one SRS resource set, or a Channel State Information Reference Signal (CSI-RS) configuration associated with the at least one SRS resource set.

4. The method of claim 3, wherein the SRS parameter configuration comprises the power control parameter configuration of the at least one SRS resource set; and transmitting, by the UE, the SRS in the active uplink BWP according to the SRS parameter configuration comprises:
   determining, by the UE, transmit power for SRS transmission on the at least one SRS resource set according to the power control parameter configuration of the at least one SRS resource set; and transmitting the SRS in the active uplink BWP according to the determined transmit power.

5. The method of claim 3, wherein the SRS parameter configuration comprises the usage configuration of the at least one SRS resource set; and transmitting, by the UE, the SRS in the active uplink BWP according to the SRS parameter configuration comprises:
   determining, by the UE, an antenna port, a transmission beam or an SRS resource number for SRS transmission on the at least one SRS resource set according to the usage configuration of the at least one SRS resource set, and transmitting the SRS in the active uplink BWP according to the determined antenna port, transmission beam or SRS resource number.

6. The method of claim 3, wherein the SRS parameter configuration comprises the aperiodic triggering state corresponding to the at least one SRS resource set; and transmitting, by the UE, the SRS in the active uplink BWP according to the SRS parameter configuration comprises:
   determining, by the UE, an SRS resource set for aperiodic SRS transmission in the active uplink BWP according to the aperiodic triggering state corresponding to the at least one SRS resource set and the aperiodic SRS triggering signaling, and transmitting the SRS in the active uplink BWP according to the determined SRS resource set.

7. The method of claim 3, wherein the SRS parameter configuration comprises the CSI-RS resource configuration associated with the at least one SRS resource set; and transmitting, by the UE, the SRS in the active uplink BWP according to the SRS parameter configuration comprises:
   determining, by the UE, at least one of a beam or a precoding matrix for SRS transmission on the at least one SRS resource set according to the CSI-RS resource configuration associated with the at least one SRS resource set, and transmitting the SRS in the active uplink BWP according to the determined at least one of beam or precoding matrix.

8. The method of claim 1, wherein the configuration of the at least one SRS resource comprises at least one of a time-frequency resource configuration of the at least one SRS resource, a sequence configuration of the at least one SRS resource, an antenna port configuration of the at least one SRS resource, a periodicity configuration of the at least one SRS resource, a spatial relation configuration of the at least one SRS resource, or an aperiodic triggering state corresponding to the at least one SRS resource.

9. The method of claim 8, wherein the SRS parameter configuration comprises a spatial relation parameter of the at least one SRS resource; and transmitting, by the UE, the SRS in the active uplink BWP according to the SRS parameter configuration comprises:
   determining, by the UE, a target SRS resource, a CSI-RS resource or a Synchronization Signal Block (SSB) spatially correlated with the at least one SRS resource according to the spatial relation parameter of the at least one SRS resource;
   determining, by the UE, a transmission beam of the at least one SRS resource according to the target SRS resource, the CSI-RS resource or the SSB; and
   transmitting, by the UE, the SRS in the active uplink BWP according to the determined transmission beam.

10. The method of claim 8, wherein the SRS parameter configuration comprises the sequence configuration of the at least one SRS resource; and transmitting, by the UE, the SRS in the active uplink BWP according to the SRS parameter configuration comprises:
  determining, by the UE, an SRS sequence for SRS transmission on the at least one SRS resource according to the sequence configuration of the at least one SRS resource, and transmitting the SRS in the active uplink BWP according to the determined SRS sequence.

11. The method of claim 8, wherein the SRS parameter configuration comprises the periodicity configuration of the at least one SRS resource; and transmitting, by the UE, the SRS in the active uplink BWP according to the SRS parameter configuration comprises:
  determining, by the UE, a periodicity operation for SRS transmission on the at least one SRS resource according to the periodicity configuration of the at least one SRS resource, and transmitting the SRS in the active uplink BWP according to the determined periodicity operation.

12. User Equipment (UE), comprising:
  one or more processors;
  memory operatively coupled to the one or more processors, the memory storing one or more programs configured for execution by the one or more processors, the one or more programs comprising instructions for a method for Sounding Reference Signal (SRS) transmission, wherein the method comprising:
    receiving high-layer signaling, wherein the high-layer signaling is used for setting at least one SRS parameter configuration respectively for each of a plurality of uplink BWPs of the UE;
    determining an active uplink Bandwidth Part (BWP) among the plurality of uplink BWPs;
    determining an SRS parameter configuration corresponding to the active uplink BWP according to the high-layer signaling, wherein the SRS parameter configuration comprises a configuration of at least one SRS resource set in the active uplink BWP and a configuration of at least one SRS resource in the active uplink BWP; and
    transmitting an SRS in the active uplink BWP according to the SRS parameter configuration.

13. The UE of claim 12, wherein the one or more programs comprises instructions for the method further comprising:
  determining the active uplink BWP according to BWP indication information, wherein latest received Downlink Control Information (DCI) for scheduling uplink transmission comprises the BWP indication information.

14. The UE of claim 12, wherein the configuration of the at least one SRS resource set comprises at least one of a power control parameter configuration of the at least one SRS resource set, a usage configuration of the at least one SRS resource set, an aperiodic triggering state corresponding to the at least one SRS resource set, or a Channel State Information Reference Signal (CSI-RS) configuration associated with the at least one SRS resource set.

15. The UE of claim 14, wherein the one or more programs comprises instructions for the method further comprising:
  determining transmitted power for SRS transmission on the at least one SRS resource set according to a power control parameter configuration of the at least one SRS resource set; and
  transmitting the SRS in the active uplink BWP according to the determined transmitted power.

16. The UE of claim 14, wherein the one or more programs comprises instructions for the method further comprising:
  determining an antenna port, a transmission beam or an SRS resource number for SRS transmission on the at least one SRS resource set according to a usage configuration of the at least one SRS resource set, and
  transmitting the SRS in the active uplink BWP according to the determined antenna port, transmission beam or SRS resource number.

17. The UE of claim 14, wherein the one or more programs comprises instructions for the method further comprising:
  determining an SRS resource set for aperiodic SRS transmission in the active uplink BWP according to an aperiodic triggering state corresponding to the at least one SRS resource set and the aperiodic SRS triggering signaling, and
  transmitting the SRS in the active uplink BWP according to the determined SRS resource set.

18. The UE of claim 14, wherein the one or more programs comprises instructions for the method further comprising:
  determining at least one of a beam or a precoding matrix for SRS transmission on the at least one SRS resource set according to a CSI-RS resource configuration associated with the at least one SRS resource set, and
  transmitting the SRS in the active uplink BWP according to the determined at least one of beam or precoding matrix.

19. The UE of claim 12, wherein the configuration of the at least one SRS resource comprises at least one of a time-frequency resource configuration of the at least one SRS resource, a sequence configuration of the at least one SRS resource, an antenna port configuration of the at least one SRS resource, a periodicity configuration of the at least one SRS resource, a spatial relation configuration of the at least one SRS resource, or an aperiodic triggering state corresponding to the at least one SRS resource.

20. The UE of claim 19, wherein the one or more programs comprises instructions for the method further comprising:
  determining a target SRS resource, a CSI-RS resource or a Synchronization Signal Block (SSB) spatially correlated with the at least one SRS resource according to a spatial relation parameter of the at least one SRS resource;
  determining a transmission beam of the at least one SRS resource according to the target SRS resource, the CSI-RS resource or the SSB; and
  transmitting the SRS in the active uplink BWP according to the determined transmission beam.

21. The UE of claim 19, wherein the one or more programs comprises instructions for the method further comprising:
  determining an SRS sequence for SRS transmission on the at least one SRS resource according to the sequence configuration of the at least one SRS resource, and
  transmitting the SRS in the active uplink BWP according to the determined SRS sequence.

22. The UE of claim 19, wherein the one or more programs comprises instructions for the method further comprising:

determining a periodicity operation for SRS transmission on the at least one SRS resource according to the periodicity configuration of the at least one SRS resource, and transmitting the SRS in the active uplink BWP according to the determined periodicity operation.

\* \* \* \* \*